(12) United States Patent
Nakagawa et al.

(10) Patent No.: US 12,221,667 B2
(45) Date of Patent: Feb. 11, 2025

(54) HOT-STAMPING FORMED BODY

(71) Applicant: NIPPON STEEL CORPORATION, Tokyo (JP)

(72) Inventors: Hiroyuki Nakagawa, Tokyo (JP); Hiroki Akutsu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 557 days.

(21) Appl. No.: 17/609,243

(22) PCT Filed: Jul. 2, 2020

(86) PCT No.: PCT/JP2020/025986
§ 371 (c)(1),
(2) Date: Nov. 5, 2021

(87) PCT Pub. No.: WO2021/002422
PCT Pub. Date: Jan. 7, 2021

(65) Prior Publication Data
US 2022/0213572 A1    Jul. 7, 2022

(30) Foreign Application Priority Data

Jul. 2, 2019    (JP) ................................ 2019-123334

(51) Int. Cl.
*C21D 9/46*    (2006.01)
*B21D 22/02*    (2006.01)
(Continued)

(52) U.S. Cl.
CPC ............. *C21D 9/46* (2013.01); *B21D 22/022* (2013.01); *C22C 38/001* (2013.01);
(Continued)

(58) Field of Classification Search
None
See application file for complete search history.

(56) References Cited

U.S. PATENT DOCUMENTS

2001/0042393 A1    11/2001    Kefferstein et al.
2013/0292009 A1    11/2013    Hayashi et al.
(Continued)

FOREIGN PATENT DOCUMENTS

JP    2001-353548 A    12/2001
JP    2003-73774 A    3/2003
(Continued)

*Primary Examiner* — Xiaowei Su
(74) *Attorney, Agent, or Firm* — Birch, Stewart, Kolasch & Birch, LLP

(57) ABSTRACT

A hot-stamping formed body includes a steel sheet having a predetermined chemical composition and a film disposed on the steel sheet. In the film, in GDS measurement in a region from a surface to a depth position of 100 μm from the surface, $Zn_{total}$ as a cumulative amount of Zn is 10.0 g/m² or more and less than 40.0 g/m², in GDS measurement in a region from the surface to a peak position of Al, a sum of Zna as a cumulative amount of Zn and a cumulative amount of Mn is 20.0 g/m² or less and a sum of a cumulative amount of Al, a cumulative amount of Si, and a cumulative amount of Cr is 60 mg/m² or more and 240 mg/m² or less, $Zn_{total}$–Zna is 3.0 g/m² or more and 30.0 g/m² or less, and an arithmetic average roughness Ra is less than 1.50 μm.

3 Claims, 2 Drawing Sheets

(51) Int. Cl.

| | |
|---|---|
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C23C 2/06* | (2006.01) |
| *C23C 2/40* | (2006.01) |

(52) U.S. Cl.
CPC .......... *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C23C 2/06* (2013.01); *C23C 2/40* (2013.01)

(56) References Cited

U.S. PATENT DOCUMENTS

| | | | |
|---|---|---|---|
| 2015/0314568 | A1 | 11/2015 | Takahashi et al. |
| 2016/0122845 | A1* | 5/2016 | Akiba .................. C21D 8/0226 148/330 |
| 2017/0145533 | A1* | 5/2017 | Sengoku ............... C23C 30/005 |
| 2018/0044754 | A1 | 2/2018 | Azuma et al. |

FOREIGN PATENT DOCUMENTS

| | | |
|---|---|---|
| JP | 2005-48254 A | 2/2005 |
| WO | WO 2012/053636 A1 | 4/2012 |
| WO | WO 2014/024825 A1 | 2/2014 |

* cited by examiner

HOT-STAMPING FORMED BODY

TECHNICAL FIELD

The present invention relates to a hot-stamping formed body. Specifically, the present invention relates to a hot-stamping formed body suitable for manufacturing a non-corrosion-resistant component such as a vehicle component.

Priority is claimed on Japanese Patent Application No. 2019-123334, filed on Jul. 2, 2019, the content of which is incorporated herein by reference.

BACKGROUND ART

Recently, in order to reduce the weight of a vehicle, high-strengthening of a steel sheet has been attempted, and a method of reducing the thickness of the steel sheet has been investigated. As a technique of press-forming a hard-to-form material such as a high strength steel sheet, a hot forming method such as hot stamping in which a steel sheet material provided for forming is pre-heated and formed is adopted.

In this forming method, forming can be performed at a high temperature where deformation resistance is small, and quenching can be performed during forming. Therefore, this forming method is excellent in that high-strengthening and formability of a member can be improved simultaneously. However, when this forming method is adopted, it is necessary to heat a steel sheet material at a high temperature of 700° C. or higher before forming. Therefore, there is a problem in that a steel sheet surface is oxidized during heating before hot stamping. A scale formed of an iron oxide produced by the oxidation of the steel sheet surface falls off during hot stamping and is attached to a die to cause a problem in that the productivity deteriorates, or remains on a surface of a formed article after hot stamping to cause a problem in that the external appearance deteriorates. Further, when this scale remains on the surface of the formed article, during coating in the next process, adhesion between the formed article and a coating film deteriorates, which causes deterioration in corrosion resistance. Therefore, after hot stamping, a scale removal process such as shot blasting is necessary.

In order to solve the problems, as a steel sheet material for hot forming, the use of a plated steel sheet that is coated with a zinc plating or an aluminum plating in order to suppress oxidation of a base steel sheet surface and/or to improve corrosion resistance of a press-formed article is disclosed. Examples of an example of using a zinc-plated steel sheet for hot forming include techniques described in Patent Documents 1 and 2 and the like.

Patent Document 3 discloses a zinc-plated steel sheet for hot forming in which adhesion between an oxide film formed during hot forming and the steel sheet is improved and a process of peeling an oxide on a press-formed article surface is simplified and unnecessary by controlling a C concentration, a Si concentration, a P concentration and/or a Ti concentration in the steel and controlling a Zn adhesion amount on the steel sheet surface and an Al concentration in the film.

CITATION LIST

Patent Document

Patent Document 1: Japanese Unexamined Patent Application, First Publication No. 2003-73774

Patent Document 2: Japanese Unexamined Patent Application, First Publication No. 2001-353548

Patent Document 3: Japanese Unexamined Patent Application, First Publication No. 2005-48254

Patent Document 4: PCT International Publication No. WO2014/024825

SUMMARY OF INVENTION

Technical Problem

Patent Documents 1 to 3 describe that, when a zinc oxide layer formed during hot stamping is excessively formed, deposition or spark may occur during spot welding after hot stamping. As a technique for suppressing deposition or spark, Patent Document 4 discloses a technique of suppressing deposition and spark during spot welding after hot forming.

Patent Document 4 discloses a zinc-plated steel sheet for hot forming in which the plating adhesion amount is 40 $g/m^2$ to 110 $g/m^2$ and deposition or spark during spot welding is suppressed. For use in hot forming, steel sheets for hot forming are roughly classified into corrosion-resistant steel sheets and non-corrosion-resistant steel sheets in terms of corrosion resistance. In the former case, the same degree of corrosion resistance as a normal zinc-plated steel sheet is required, and as the Zn content in the film contributing to corrosion resistance increases, corrosion resistance is improved. However, in the latter case, only the same degree of corrosion resistance as a normal cold-rolled steel sheet is required. Therefore, from the viewpoint of corrosion resistance, the Zn content in the film is not important and the Zn content only needs to be a value in which scale after hot stamping can be suppressed.

Patent Document 4 describes that, in order to secure the Zn content in which oxidation of a steel sheet can be suppressed, a plating adhesion amount of 40 $g/m^2$ or more is required. As a result of an investigation by the present inventors, in the technique described in Patent Document 4, it was found that, when the plating adhesion amount is less than 40 $g/m^2$, it is difficult to adjust the Al content in the film to be 150 $mg/m^2$ or more during normal hot-dip galvannealing and it is difficult to prevent spark and deposition during spot welding.

Accordingly, even when the plating adhesion amount is less than 40 $g/m^2$, as long as scale after hot stamping can be suppressed and spark and deposition after spot welding can be prevented, costs can be reduced by reducing the Zn content, which can also contribute to suppressing the use of Zn resources.

Vehicle body components of a vehicle are assembled by joining the components that are hot-stamped in various shapes by resistance welding (in particular, spot welding). In particular, when the nugget diameter is 4√t or more (t represents the sheet thickness of a component) during spot welding, as a current range (appropriate welding current range) where spatter does not occur becomes wider, robustness to unevenness in manufacturing is improved, which can contribute to improvement of productivity.

In general, the appropriate welding current range in a plated steel sheet is narrower than that of a cold-rolled steel sheet. The reason for this is that the melting point decreases due to plating such that a limit current at which spatter occurs decreases. If the plating adhesion amount can be reduced, the appropriate welding current range can be widened. However, in the case of a general plated steel sheet, the lower limit of the plating adhesion amount is limited to secure corrosion resistance. In the case of a non-corrosion-resistant steel sheet for hot stamping, a large amount of Zn is unnecessary from the viewpoint of securing corrosion resistance. Thus, it is considered that, if the Zn content can be reduced, the appropriate welding current range can be widened, which can contribute to improvement of productivity.

For vehicle body components of a vehicle, coating film adhesion is required to perform a coating process including chemical conversion and electrodeposition after spot welding described above. When the zinc-plated steel sheet is hot-stamped, the plating reacts with base metal to form a new alloy, and the surface is oxidized to form a Zn oxide. It is known that this Zn oxide has satisfactory adhesion with a chemical conversion film. However, according to an investigation by the present inventors, it was found that surface oxides include not only a Zn oxide but also a wide variety of oxides such as a Mn oxide, an Al oxide, a Si oxide, or a Cr oxide, and when the Zn content is low, coating film adhesion deteriorates depending on conditions. Accordingly, in order to apply a low-Zn plating to a vehicle, a new technique of controlling various oxides to secure coating film adhesion is required.

In addition, a vehicle body component of a vehicle is required to absorb energy during collision, and a reduction in weight by a high strength material is required to improve fuel consumption. Deformation during collision is complicated, and if bendability is satisfactory, early-stage segmentation is likely to be capable of being suppressed. Therefore, a component having high strength and high bendability is required. The strength of a hot-stamped component is substantially determined depending on the carbon content. However, even at the same strength, bendability varies depending on chemical compositions or manufacturing methods. Accordingly, if bendability after hot stamping can be improved, applicable components increase, and industrial utility is significantly improved.

That is, the hot-stamping formed body to be applied to a vehicle body component of a vehicle is required to have excellent coating film adhesion and is required to have excellent bendability as a more preferable characteristic.

The present invention has been made in consideration of the above-described problems, and an object thereof is to provide a hot-stamping formed body that has a high strength, has suppressed production of scale, can prevent spark and deposition during spot welding, has a wide appropriate welding current range, and has excellent coating film adhesion and bendability.

Solution to Problem

The present inventors conducted a thorough investigation on conditions capable of suppressing the production of scale after hot-stamping a zinc-plated steel sheet for hot stamping. As a result, it was found that, by controlling a chemical composition of a steel sheet on which a zinc plating film is to be formed and a plating adhesion amount, an Fe concentration, an Al content, and an Al concentration in the zinc plating film, an Al oxide and optionally a Si oxide and a Cr oxide are formed on the film surface during heating before hot stamping such that the zinc metal in the film is suppressed from being excessively converted into oxides and from being evaporated, and an appropriate amount of a zinc oxide is formed on the film surface such that the production of scale can be suppressed.

In addition, the present inventors newly found that, when the Si content, the Cr content, and the Al content in the zinc-plated steel sheet for hot stamping and the Al content in the zinc plating film are excessively large, the adhesion between the zinc oxide in the film after hot stamping and an Fe—Zn solid solution formed below the zinc oxide deteriorates such that coating film adhesion (adhesion between the film and the coating film disposed over the film) deteriorates. Further, the present inventors newly found that, when the surface roughness after hot stamping decreases, the bendability after hot stamping can be improved.

The present invention has been made based on the above findings, and the scope thereof is as follows.

[1] According to one aspect of the present invention, there is provided a hot-stamping formed body including a steel sheet and a film disposed on the steel sheet, in which the steel sheet includes, as a chemical composition, by mass %:
C: 0.02% to 0.58%;
Mn: 0.10% to 3.00%;
sol. Al: 0.001% to 1.000%;
Si: 2.00% or less;
P: 0.100% or less;
S: 0.005% or less;
N: 0.0100% or less;
Ti: 0% to 0.200%;
Nb: 0% to 0.200%;
V: 0% to 1.00%;
W: 0% to 1.00%;
Cr: 0% to 1.00%;
Mo: 0% to 1.00%;
Cu: 0% to 1.00%;
Ni: 0% to 1.00%;
B: 0% to 0.0100%;
Ca: 0% to 0.05%;
REM: 0% to 0.05%; and
a remainder comprising Fe and impurities, and
in the film,
in GDS measurement in a region from a surface of the film to a depth position of 100 μm from the surface, $Zn_{total}$ as a cumulative amount of Zn is 10.0 g/m$^2$ or more and less than 40.0 g/m$^2$,
in GDS measurement in a region from the surface to a peak position of Al, a sum of Zna as a cumulative amount of Zn and a cumulative amount of Mn is 20.0 g/m$^2$ or less and a sum of a cumulative amount of Al, a cumulative amount of Si, and a cumulative amount of Cr is 60 mg/m$^2$ or more and 240 mg/m$^2$ or less,
$Zn_{total}$–Zna is 3.0 g/m$^2$ or more and 30.0 g/m$^2$ or less, and
an arithmetic average roughness Ra is less than 1.50 μm.
[2] The hot-stamping formed body according to [1],
in which the chemical composition of the steel sheet includes, by mass %, one or two kinds selected from the group consisting of:
Ti: 0.005% to 0.200%;
Nb: 0.005% to 0.200%;
V: 0.10% to 1.00%; W: 0.10% to 1.00%;
Cr: 0.05% to 1.00%;
Mo: 0.05% to 1.00%;
Cu: 0.05% to 1.00%;
Ni: 0.05% to 1.00%;
B: 0.0010% to 0.0100%;
Ca: 0.0005% to 0.05%; and
REM: 0.0005% to 0.05%.

Advantageous Effects of Invention

According to the above-described aspect of the present invention, it is possible to provide a hot-stamping formed body that has a high strength, has suppressed production of scale after hot stamping, can prevent spark and deposition during spot welding, has a wide appropriate welding current range, and has excellent coating film adhesion and bendability.

In the zinc-plated steel sheet for hot stamping according to the above-described aspect, the adhesion amount of the zinc plating film is suppressed. Therefore, with the zinc-plated steel sheet for hot stamping, a vehicle component can be manufactured by hot stamping, spot welding, chemical conversion, and electrodeposition at low costs, and the zinc-plated steel sheet for hot stamping is suitable for use in a vehicle component.

EMBODIMENTS OF THE INVENTION

Figure 1:
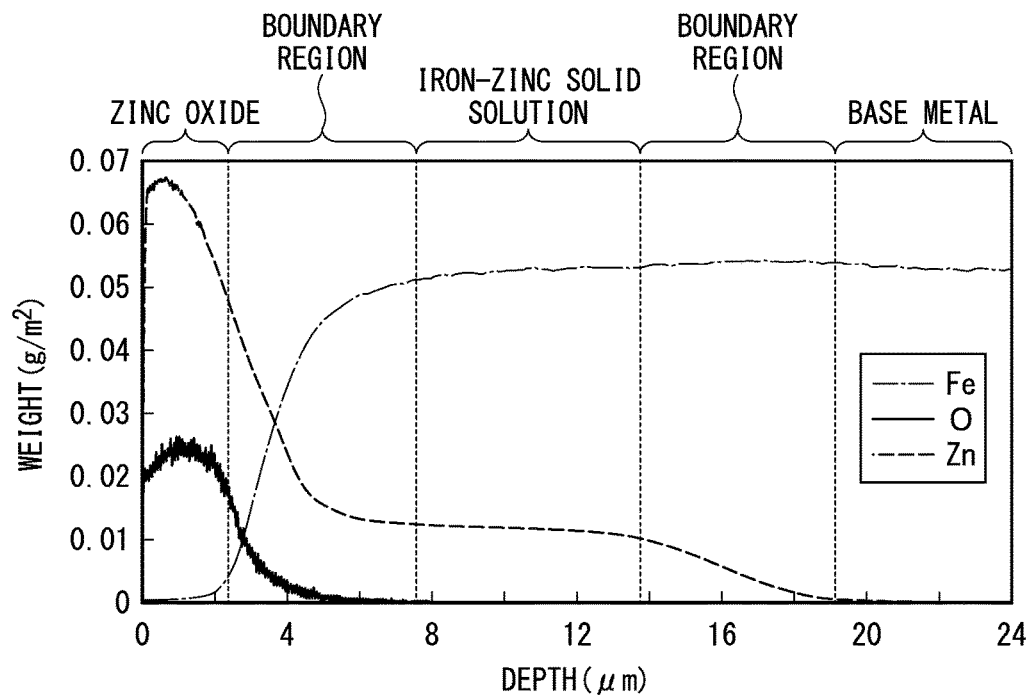
FIG. 1 is a diagram showing measurement results obtained in GDS measurement in a depth direction from a film surface of a hot-stamping formed body.

Hereinafter, a preferable embodiment of the present invention will be described in detail. The present invention is not limited only to the configuration disclosed in the embodiment and can be modified within a range not departing from the scope of the present invention. A limited numerical range described below includes a lower limit and an upper limit. A numerical value shown together with "more than" or "less than" is not included in a numerical range. All the "%" in the chemical composition represents "mass %".

A zinc-plated steel sheet for hot stamping (hereinafter, also referred to as "plated steel sheet") that is applied to a hot-stamping formed body according to the embodiment includes a steel sheet and a zinc plating film disposed on the steel sheet. First, the steel sheet of the zinc-plated steel sheet for hot stamping that is applied to the hot-stamping formed body according to the embodiment will be described. The chemical composition of the steel sheet does not change before and after hot stamping. Therefore, the chemical composition of the steel sheet forming the zinc-plated steel sheet for hot stamping and the chemical composition of the steel sheet forming the hot-stamping formed body are the same.

1. Chemical Composition of Steel Sheet

[C: 0.02% to 0.58%]

C is an element that is important for improving hardenability of the steel sheet to obtain the strength of the hot-stamping formed body after quenching (after hot stamping). In addition, C is an element that decreases the $Ac_3$ point to decrease a quenching temperature. When the C content is less than 0.02%, the effect cannot be sufficiently obtained. Accordingly, the C content is set to be 0.02% or more. The C content is preferably 0.10% or more or 0.20% or more.

On the other hand, when the C content is more than 0.58%, the toughness of the hot-stamping formed body after hot stamping deteriorates significantly. Accordingly, the C content is set to be 0.58% or less. The C content is preferably 0.55% or less or 0.50% or less.

[Mn: 0.10% to 3.00%]

Mn is an element that is important for improving hardenability of the steel sheet and stably obtaining the strength of the hot-stamping formed body after quenching. When the Mn content is less than 0.10%, the effect cannot be sufficiently obtained. Accordingly, the Mn content is set to be 0.10% or more. The Mn content is preferably 0.20% or more, 0.30% or more, or 0.40% or more.

On the other hand, when the Mn content is excessively large, Mn is diffused in the zinc plating film during heating before hot stamping, and a large amount of a Mn oxide is produced on the film surface of the hot-stamping formed body. As a result spot weldability deteriorates. Accordingly, the Mn content is set to be 3.00% or less. The Mn content is preferably 2.80% or less, 2.60% or less, or 2.40% or less.

[sol. Al: 0.001% to 1.000%]

Al has an action of deoxidizing the steel to make the steel sound (to prevent the occurrence of defects such as blowholes in the steel). When the sol. Al content is less than 0.001%, the effect cannot be obtained due to the above-described action. Accordingly, the sol. Al content is set to be 0.001% or more. The sol. Al content is preferably 0.010% or more, 0.020% or more, or 0.030% or more.

On the other hand, when the sol. Al content is excessively large, sol. Al is diffused in the zinc plating film during heating before hot stamping, and a large amount of an Al oxide is produced on the film surface of the hot-stamping formed body. As a result, adhesion between the film and the chemical conversion film deteriorates. Accordingly, the sol. Al content is set to be 1.000% or less. The sol. Al content is preferably 0.800% or less, 0.100% or less, 0.075% or less, or 0.070% or less.

sol. Al refers to an acid-soluble Al and refers to solid solution Al present in the steel in a solid solution state.

[Si: 2.00% or Less]

Si deteriorates adhesion between a zinc oxide layer formed by heating before hot stamping and the steel sheet by being concentrated on an interface between the zinc oxide layer and the steel sheet. Therefore, the Si content is set to be 2.00% or less. The Si content is preferably 1.00% or less, 0.70% or less, or 0.50% or less. The Si content is preferably as small as possible, and the lower limit is not particularly limited. An excessive decrease in Si content causes an increase in refining costs. Therefore, the Si content may be set to be 0.01% or more.

[P: 0.100% or Less]

P has an action of embrittling the steel when included in the steel as an impurity. Therefore, it is preferable that the P content is small. Therefore, the P content is set to be 0.100% or less. The P content is preferably 0.050% or less, 0.020% or less, or 0.015% or less. The lower limit of the P content is not particularly limited. An excessive decrease in P content causes an increase in refining costs. Therefore, the P content may be 0.001% or more.

[S: 0.005% or Less]

S is an element that is included as an impurity and has an action of forming MnS and embrittling the steel. Therefore, it is preferable that the S content is small. Therefore, the S content is set to be 0.005% or less. The S content is preferably 0.004% or less or 0.003% or less. The lower limit of the S content is not particularly limited. An excessive decrease in S content causes an increase in refining costs. Therefore, the S content may be set to be 0.0003% or more or 0.001% or more.

[N: 0.0100% or Less]

N is an element that is included as an impurity, forms an inclusion in the steel, and deteriorates toughness of the hot-stamping formed body. Therefore, it is preferable that the N content is small. Therefore, the N content is 0.0100% or less. The N content is preferably 0.0080% or less, 0.0070% or less, 0.0050% or less, or 0.0045% or less. The lower limit of the N content is not particularly limited. An excessive decrease in N content causes an increase in refining costs. Therefore, the N content may be 0.0005% or more.

The remainder in the chemical composition of the steel sheet according to the embodiment comprises Fe and impurities. Examples of the impurities include elements that are unavoidably incorporated from steel raw materials or scraps and/or in the steelmaking process and elements that are allowable in a range where the characteristics of the hot-stamping formed body according to the embodiment do not deteriorate.

The steel sheet may include the following optional elements instead of Fe in the remainder. The steel sheet does not need to include the following optional elements, and when the steel sheet does not include the optional elements, the content thereof is 0%.

[Ti: 0% to 0.200%, Nb: 0% to 0.200%, V: 0% to 1.00%, and W: 0% to 1.00%]

Ti, Nb, V, and W are elements that accelerate interdiffusion between Fe and Zn in the zinc plating film and the steel sheet to suppress the formation of a molten Zn alloy layer during hot stamping. When the molten Zn alloy layer is formed, cracking may occur during hot stamping, which is not preferable. Accordingly, the steel sheet may include Ti, Nb, V, and W. In order to reliably obtain the effects, it is preferable that the steel sheet includes one or more selected from the group consisting of Ti: 0.005% or more, Nb: 0.005% or more, V: 0.10% or more, and W: 0.10% or more.

However, when the Ti content or the Nb content is more than 0.200% or when the V content or the W content is more than 1.00%, the effects are saturated and the alloy costs increase. Accordingly, each of the Ti content and the Nb content is set to be 0.200% or less, and each of the V content and the W content is set to be 1.00% or less. Each of the Ti content and the Nb content is preferably 0.150% or less, and each of the V content and the W content is preferably 0.50% or less.

[Cr: 0% to 1.00%, Mo: 0% to 1.00%, Cu: 0% to 1.00%, Ni: 0% to 1.00%, and B: 0% to 0.0100%]

Cr, Mo, Cu, Ni, and B are elements that improve the hardenability of the steel sheet and improves the strength of the hot-stamping formed body. Accordingly, the steel sheet may include one kind or two or more kinds among these elements. In order to reliably obtain the effects, it is preferable that the steel sheet includes one or more selected from the group consisting of Cr: 0.05% or more, Mo: 0.05% or more, Cu: 0.05% or more, Ni: 0.05% or more, and B: 0.0010% or more. However, when the Cr content, the Mo content, the Cu content, or the Ni content is more than 1.00% or when the B content is more than 0.0100%, the effects are saturated and the alloy costs increase. Accordingly, each of the Cr content, the Mo content, the Cu content, and the Ni content is set to be 1.00% or less, and the B content is set to be 0.0100% or less. The B content is preferably set to be 0.0080% or less.

[Ca: 0% to 0.05% and REM: 0% to 0.05%]

Ca and REM have an effect of refining an inclusion in the steel to prevent cracking during hot stamping caused by the inclusion. Accordingly, the steel sheet may include one kind or two or more kinds among these elements. In order to reliably obtain the effects, it is preferable that the steel sheet includes one or more selected from the group consisting of Ca: 0.0005% or more and REM: 0.0005% or more. However, when the Ca content or the REM content is more than 0.05%, the effect of refining an inclusion in the steel is saturated, and the alloy costs increase. Accordingly, each of the Ca content and the REM content is set to be 0.05% or less.

Here, REM refers to 17 elements in total including Sc, Y, and lanthanoids, and the REM content refers to the total content of these elements. REM is included by mischmetal in many cases. In addition to La and Ce, lanthanoid elements may be multiply included. Even when lanthanoid elements may be multiply included in addition to La and Ce, the hot-stamping formed body according to the embodiment can exhibit the effects. In addition, when a metal REM such as metal La or Ce is included, the hot-stamping formed body according to the embodiment can exhibit the effects.

The above-described chemical composition of the steel sheet may be measured using a general analysis method. For example, the chemical composition may be measured using inductively coupled plasma-atomic emission spectrometry (ICP-AES). Sol. Al may be measured by ICP-AES using a filtrate after thermolysis of a sample with an acid. C and S may be measured using an infrared absorption method after combustion, and N may be measured using an inert gas fusion-thermal conductivity method. When the steel sheet includes a zinc plating film or a film on the surface, the chemical composition may be analyzed after removing the zinc plating film or the film from the surface by mechanical grinding.

2. Zinc Plating Film of Zinc-Plated Steel Sheet for Hot Stamping

The zinc-plated steel sheet for hot stamping includes the zinc plating film on the steel sheet. In the zinc plating film, the plating adhesion amount is 15.0 $g/m^2$ or more and less than 40.0 $g/m^2$, the Fe concentration is 1.5 mass % or more and 8.0 mass % or less, the Al content is 100 $mg/m^2$ or more and 400 $mg/m^2$ or less, the Al concentration is 0.50 mass % or more and 3.00 mass % or less, and the remainder comprises Zn and impurities. Hereinafter, the details of the zinc plating film will be described.

[Plating Adhesion Amount]

The zinc-plated steel sheet for hot stamping includes the zinc plating film on the steel sheet. In the zinc plating film, the plating adhesion amount is 15.0 $g/m^2$ or more and less than 40.0 $g/m^2$. In the embodiment, the plating adhesion amount refers to the plating adhesion amount per surface of the steel sheet. When the plating adhesion amount is less than 15.0 $g/m^2$, scale is produced during heating before hot stamping. Therefore, the plating adhesion amount is 15.0 $g/m^2$ or more. The plating adhesion amount is preferably 18.0 $g/m^2$ or more or 20.0 $g/m^2$ or more.

On the other hand, when the plating adhesion amount is 40.0 $g/m^2$ or more, the appropriate welding current range of the hot-stamping formed body during spot welding becomes narrower. Therefore, the plating adhesion amount is less than 40.0 $g/m^2$. The plating adhesion amount is preferably 35.0 $g/m^2$ or less or 30.0 $g/m^2$ or less.

The plating adhesion amount of the zinc plating film is measured using a test method described in JIS H 0401:2013 after collecting a test piece from any position of the zinc-plated steel sheet for hot stamping.

[Fe Concentration in Zinc Plating Film]

When the Fe concentration in the zinc plating film is 8.0 mass % or less, the heating rate during heating before hot stamping decreases. Therefore, when the steel sheet is held in a heating furnace, the residence time at a high temperature decreases. As a result, the evaporation amount and the oxidation amount of Zn can be suppressed to suppress the production of scale, and spark during spot welding can be suppressed.

When the Fe concentration in the zinc plating film is excessively high, the heating rate during heating before hot stamping increases, and when the steel sheet is held in a heating furnace, the residence time at a high temperature increases. Therefore, the possibility of production of scale during the evaporation of Zn and the possibility of occurrence of spark during spot welding increase. Therefore, the Fe concentration in the zinc plating film is set to be 8.0 mass % or less. The Fe concentration is preferably 7.5 mass % or less, 7.0 mass % or less, and 6.0 mass % or less.

[Al Content and Al Concentration in Zinc Plating Film]

In the zinc plating film, the Al content is 100 mg/m$^2$ or more and 400 mg/m$^2$ or less, and the Al concentration is 0.50 mass % or more and 3.00 mass % or less. When the Al content in the zinc plating film is less than 100 mg/m$^2$ or the Al concentration in the zinc plating film is less than 0.50 mass %, the amount of an Al oxide formed on the surface layer of the zinc plating film during heating before hot stamping decreases. As a result, the oxidation of Zn is not suppressed, a Zn-based oxide is excessively formed such that spark and/or deposition occurs during spot welding. In addition, the evaporation amount of Zn increases, the coating weight of Zn in the zinc plating film decreases, and scale is produced. Therefore, in the zinc plating film, the Al content is set to be 100 mg/m$^2$ or more, and the Al concentration is set to be 0.50 mass % or more. The Al content is preferably 150 mg/m$^2$ or more or 170 mg/m$^2$ or more. In addition, the Al concentration is preferably 0.65 mass % or more, 0.70 mass % or more, or 0.75 mass % or more.

On the other hand, when the Al content in the zinc plating film is more than 400 mg/m$^2$ or the Al concentration is more than 3.00 mass %, coating film adhesion in the hot-stamping formed body deteriorates. Therefore, in the zinc plating film, the Al content is set to be 400 mg/m$^2$ or less, and the Al concentration is set to be 3.0 mass % or less. The Al content is preferably 350 mg/m$^2$ or less and more preferably 300 mg/m$^2$ or less. In addition, the Al concentration is preferably 2.00 mass % or less or 1.70 mass % or less.

The Al content in a zinc plating film of a hot-dip galvanized steel sheet manufactured on a continuous hot-dip galvanizing line is affected by an atmosphere during heating before annealing, a bath temperature, a steel sheet temperature during infiltration into a plating bath, a dipping time, a plating adhesion amount, an Al concentration in a bath, and the like. Therefore, by empirically obtaining a relationship between these manufacturing conditions and the Al content in the zinc plating film and controlling the relationship, the Al content in the zinc plating film can be set to be 100 mg/m$^2$ or more.

[Remainder in Zinc Plating Film]

The remainder in the zinc plating film comprises Zn and impurities, in which the impurity content is preferably set to be 0.1% or less.

The Fe concentration, the Al concentration, and the Al content in the zinc plating film are measured using the following method.

Only the zinc plating film of the zinc-plated steel sheet for hot stamping is dissolved and removed using a 5 vol % HCl aqueous solution to which an inhibitor is added. By measuring the Zn concentration, the Fe concentration, and the Al concentration in the obtained solution by inductively coupled plasma-atomic emission spectrometry (ICP-AES), the Zn concentration, the Fe concentration, the Al concentration, and the Al content in the zinc plating film are obtained.

By heating and hot-stamping the zinc-plated steel sheet for hot stamping described above, a hot-stamping formed body having excellent coating film adhesion and bendability is obtained. Hereinafter, the hot-stamping formed body according to the embodiment will be described.

The hot-stamping formed body according to the embodiment includes the steel sheet having the above-described chemical composition and a film disposed on the steel sheet. Hereinafter, the film of the hot-stamping formed body according to the embodiment will be described in detail.

3. Film of Hot-Stamping Formed Body

By heating before hot stamping, the zinc plating film of the zinc-plated steel sheet for hot stamping reacts with base metal, and various oxidation reactions occur on the surface. FIG. 1 shows measurement results of Fe, O, and Zn of which the detection amount is large among measurement results obtained by measuring GDS of a sample cut from the hot-stamping formed body in a depth direction from the film surface. It can be seen from FIG. 1 that an Fe—Zn solid solution (iron-zinc solid solution) where the base metal is molten in the zinc plating film is present on the base metal and zinc oxide is present thereon.

Figure 2:
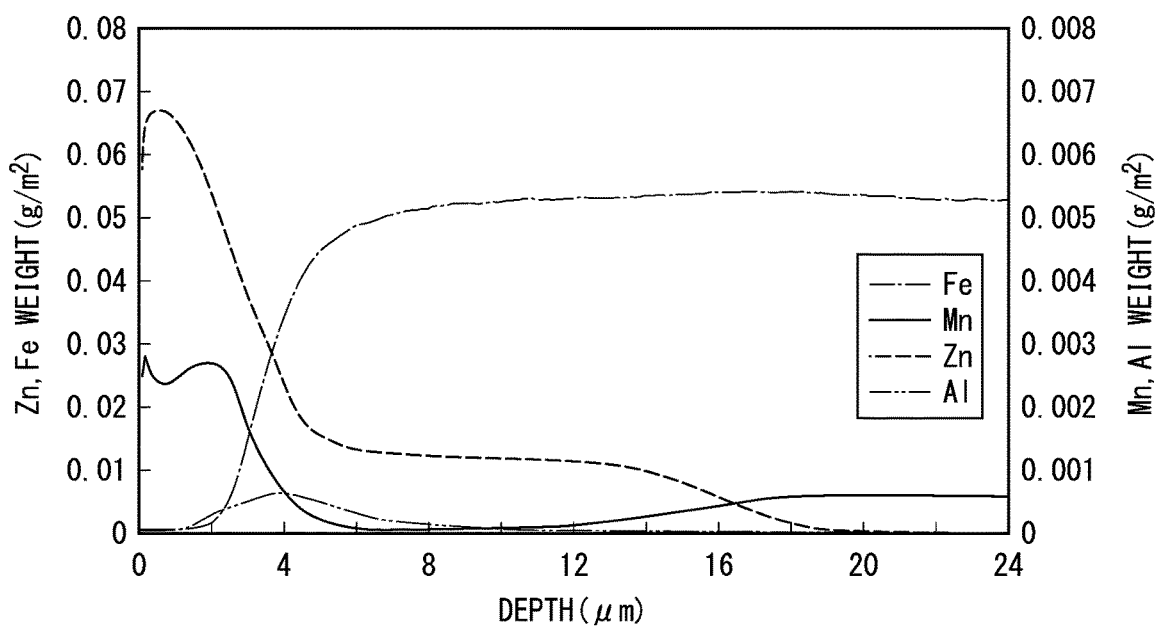
FIG. 2 is a diagram showing measurement results obtained in GDS measurement in the depth direction from the film surface of the hot-stamping formed body.

FIG. 2 shows the measurement results of Fe, Zn, Mn, and Al among the same measurement results as those of FIG. 1. It can be seen from FIG. 2 that, although the amount is much less than those of Fe and Zn, Mn is detected at the same position as the zinc oxide and a Zn-based oxide (zinc oxide) and a Mn-based oxide are formed on the surface layer. In addition, as shown in the same drawing, it can be seen that, although the amount thereof is small, Al is detected in a boundary region between the zinc oxide and the Fe—Zn solid solution.

Figure 3:
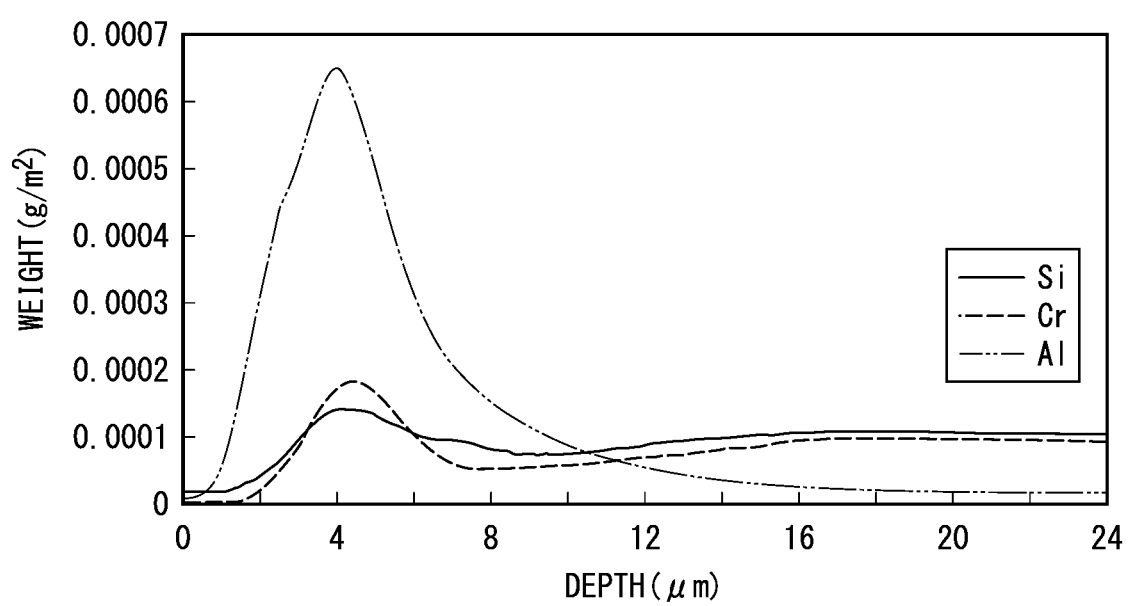
FIG. 3 is a diagram showing measurement results obtained in GDS measurement in the depth direction from the film surface of the hot-stamping formed body.

FIG. 3 shows the measurement results of Si, Cr, and Al among the same measurement results as those of FIGS. 1 and 2. As shown in FIG. 3, peaks of Cr and Si are detected in the boundary region between the zinc oxide and the Fe—Zn solid solution where Al is detected although the amount thereof is small. The reason why the peaks of Cr and Si are detected is presumed to be that the sample includes Cr and Si.

It is presumed from the measurement results shown in FIGS. 1 to 3 that a Zn-based oxide and a Mn-based oxide are mainly present in the upper layer of the oxide layer of the hot-stamping formed body and an Al-based oxide and small amounts of a Cr-based oxide and a Si-based oxide are mainly present in the lower layer of the oxide layer.

The hot-stamping formed body according to the embodiment includes, on the surface of the film, a Zn-based oxide, a Mn-based oxide, and an Al-based oxide and, when the base metal steel sheet includes Cr and Si, further includes a Cr-based oxide and a Si-based oxide. A P-based oxide, a Ti-based oxide, and a Nb-based oxide may be included as the remainder. The formation mechanism of these oxide phases by heating before hot stamping is not entirely clear but is presumed to be as follows from the GDS measurement results.

At an initial stage of heating before hot stamping, an Al-based oxide is formed on the surface layer, and oxidation of Zn is suppressed. By further performing heating, a Zn-based oxide is formed on the Al-based oxide. Accordingly, when the Al content in the zinc plating film is large, the amount of the Al-based oxide increases. Therefore, the amount of the Zn-based oxide decreases. In addition, these reactions occur in parallel with integration between the base metal and the zinc plating film. Therefore, oxides of Mn, Cr, and Si as easily oxidizable elements in the base metal are formed although the amounts thereof are small. Due to a difference in easy oxidizability, and Cr and Si are formed at the same position as Al, and Mn is formed at the same position as Zn. Although it is difficult to accurately determine these oxides, it can be presumed from the above-described structure that the total content of the Zn content and the Mn content in a region from the surface to a peak position of Al is proportional to the total content of the Zn-based oxide and the Mn-based oxide. When this total content is large, spark occurs during spot welding.

On the other hand, it is presumed that the total content of the Al content, the Si content, and the Cr content in a region from the surface of the film to the peak position of Al can be approximated to a value proportional to ½ of the total content of the Al-based oxide, the Si-based oxide, and the Cr-based oxide. When this content is large, adhesion between the zinc oxide and the Fe—Zn solid solution deteriorates, and coating film adhesion deteriorates. The solid solution phase (Fe—Zn solid solution) of Fe and Zn in a metallic state is present below the above-described oxides, and when this solid solution phase is deficient even partially, scale is produced during heating.

[Film Structure]

The film having the above-described various oxides has the following film structure.

In the hot-stamping formed body according to the embodiment, in GDS measurement in a region from a surface of the film to a depth position of 100 µm from the surface, $Zn_{total}$ as a cumulative amount of Zn is 10.0 g/m$^2$ or more and less than 40.0 g/m$^2$, in GDS measurement in a region from the surface of the film to a peak position of Al, a sum of Zna as a cumulative amount of Zn and a cumulative amount of Mn is 20.0 g/m$^2$ or less and a sum of a cumulative amount of Al, a cumulative amount of Si, and a cumulative amount of Cr is 60 mg/m$^2$ or more and 240 mg/m$^2$ or less, and $Zn_{total}$-Zna is 3.0 g/m$^2$ or more and 30.0 g/m$^2$ or less.

The peak position of Al refers to an intermediate point between two positions where the intensity of Al is 95% of the maximum intensity of Al that are positioned before and after the maximum intensity of Al in GDS measurement in the depth direction from the surface of the film. In addition, the cumulative amount refers to the sum of values obtained by performing GDS measurement of the weight per unit area in a depth direction up to a predetermined depth every second.

In the GDS measurement in the region from the surface of the film to a depth position of 100 µm from the surface, when $Zn_{total}$ as the cumulative amount of Zn is less than 10.0 g/m$^2$, the production of scale after hot stamping cannot be suppressed. Therefore, $Zn_{total}$ is set to be 10.0 g/m$^2$ or more. $Zn_{total}$ is preferably 15.0 g/m$^2$ or more or 20.0 g/m$^2$ or more.

In addition, when $Zn_{total}$ is 40.0 g/m$^2$ or more, the plating adhesion amount increases, and the appropriate welding current range during spot welding becomes narrower. Therefore, $Zn_{total}$ is set to be less than 40.0 g/m$^2$. $Zn_{total}$ is preferably 35.0 g/m$^2$ or less.

In the GDS measurement in the region from the surface of the film to the peak position of Al, when the sum of Zna as a cumulative amount of Zn in the region from the surface of the film to the peak position of Al and the cumulative amount of Mn in the region from the surface of the film to the peak position of Al is more than 20.0 g/m$^2$, the amount of the Zn-based oxide and the Mn-based oxide is large. Therefore, spark occurs during spot welding. Therefore, the sum of Zna and the cumulative amount of Mn in the region from the surface to the peak position of Al is set to be 20.0 g/m$^2$ or less. The sum of Zna and the cumulative amount of Mn in the region from the surface to the peak position of Al is preferably 18.0 g/m$^2$ or less, 15.0 g/m$^2$ or less, or 13.0 g/m$^2$ or less.

The lower limit of the sum of Zna and the cumulative amount of Mn in the region from the surface to the peak position of Al is not particularly limited and may be 0.1 g/m$^2$ or more, 2.0 g/m$^2$ or more, or 5.0 g/m$^2$ or more.

In the GDS measurement in the region from the surface of the film to the peak position of Al, when the sum of the cumulative amount of Al, the cumulative amount of Si, and the cumulative amount of Cr is less than 60 mg/m$^2$, the amount of a Zn-based oxide and a Mn-based oxide increases such that spark occurs during spot welding. Therefore, in the region from the surface of the film to the peak position of Al, the sum of the cumulative amount of Al, the cumulative amount of Si, and the cumulative amount of Cr is 60 mg/m$^2$ or more. The sum of the cumulative amount of Al, the cumulative amount of Si, and the cumulative amount of Cr is 100 mg/m$^2$ or more or 130 mg/m$^2$ or more.

In addition, when the sum of the cumulative amounts of these elements is more than 240 mg/m$^2$, the coating film adhesion deteriorates. Therefore, in the region from the surface of the film to the peak position of Al, the sum of the cumulative amount of Al, the cumulative amount of Si, and the cumulative amount of Cr is 240 mg/m$^2$ or less. The sum of the cumulative amount of Al, the cumulative amount of Si, and the cumulative amount of Cr is 220 mg/m$^2$ or less or 200 mg/m$^2$ or less.

When the steel sheet does not include Cr or Si, Cr or Si is not detected in the GDS measurement on the film. However, since it is important to control the sum of the cumulative amount of Al, the cumulative amount of Si, and the cumulative amount of Cr, even when Cr or Si is not detected, there is no problem. That is, when the steel sheet does not include Cr and Si, the cumulative amount of Al in the region from the surface of the film to the peak position of Al may be 60 mg/m$^2$ or more and 240 mg/m$^2$ or less.

When the value ($Zn_{total}$–Zna) obtained by subtracting Zna that is the cumulative amount of Zn in the region from the surface of the film to the peak position of Al from $Zn_{total}$ that is the cumulative amount of Zn in a region from the surface of the film to a depth position of 100 µm is less than 3.0 g/m$^2$, scale is produced. Therefore, $Zn_{total}$–Zna is set to be 3.0 g/m$^2$ or more. $Zn_{total}$–Zna is preferably 4.0 g/m$^2$ or more, 8.0 g/m$^2$ or more, or 10.0 g/m$^2$ or more.

In addition, when $Zn_{total}$–Zna is more than 30.0 g/m$^2$, the appropriate welding current range becomes narrower. Therefore, $Zn_{total}$–Zna is set to be 30.0 g/m$^2$ or less. $Zn_{total}$–Zna is preferably 25.0 g/m$^2$ or less or 20.0 g/m$^2$ or less.

The GDS measurement is performed using the following method.

At any three positions of the hot-stamping formed body, the weights of Fe, Al, Si, Mn, Cr, and Zn in a region from the surface of the film to a position of 100 µm in the depth direction (sheet thickness direction) are measured. By calculating the cumulative amounts of Zn from the measurement results obtained at the three positions and obtaining the average value thereof, $Zn_{total}$ that is the cumulative amount of Zn in a region from the surface of the film to a depth position of 100 µm is obtained. In addition, after obtaining the peak position of Al defined as described above from the obtained measurement results, the cumulative amount of each of the elements (Zn, Mn, Al, Si, and Cr) in the region from the surface to the peak position of Al is obtained. By obtaining the average value of the cumulative amounts of each of the elements obtained by the measurement at three positions, the cumulative amount of each of the elements is obtained. For the measurement, a Marcus type glow discharge optical emission spectrometer (GD-Profiler, manufactured by Horiba Ltd.) is used.

[Arithmetic Average Roughness Ra]

The arithmetic average roughness Ra of the film is less than 1.50 μm. When the arithmetic average roughness Ra is less than 1.50 μm, unevenness that causes bending is small. Therefore, while securing coating film adhesion, the bendability of the hot-stamping formed body can be improved. Therefore, the arithmetic average roughness Ra is less than 1.50 μm. The arithmetic average roughness Ra is preferably 1.30 μm or less, 1.10 μm or less, 1.00 μm or less, or 0.90 μm or less.

The lower limit of the arithmetic average roughness Ra is not particularly limited and may be 0.01 μm or more, 0.10 μm or more, or 0.50 μm or more.

The arithmetic average roughness Ra of the film of the hot-stamping formed body is measured using the following method. A 50 mm×50 mm test piece is cut at a position 10 mm or more distant from an end surface of the hot-stamping formed body, three lines are analyzed in any direction using a confocal microscope (manufactured by Lasertec Corporation), and three lines are analyzed in a direction perpendicular to the direction. By calculating the arithmetic average roughness Ra from the obtained result according to JIS B 0601:2001 and calculating the average value of the six lines in total, the arithmetic average roughness Ra of the film is obtained.

In the hot-stamping formed body according to the embodiment, the tensile strength is preferably 900 MPa or higher. By setting the tensile strength to be 900 MPa or higher, the hot-stamping formed body can be suitably applied to a vehicle component. The tensile strength is preferably 1000 MPa or higher, 1500 MPa or higher, or 1800 MPa or higher. The upper limit of the tensile strength is not particularly limited and may be 3000 MPa or lower or 2800 MPa or lower.

The tensile strength of the hot-stamping formed body is obtained by collecting a JIS No. 5 test piece from a position of the hot-stamping formed body other than a region within 10 mm from an edge and performing a tensile test according to JIS Z 2241:2011.

4. Method of Manufacturing Zinc-Plated Steel Sheet for Hot Stamping

The zinc-plated steel sheet for hot stamping is obtained by heating the steel sheet in the austenite region or a temperature range near the austenite region and hot-stamping the heated steel sheet in the temperature range. Accordingly, mechanical properties of the zinc-plated steel sheet for hot stamping at room temperature before heating are not important. Therefore, the metallographic structure of the zinc-plated steel sheet for hot stamping before heating is not particularly limited. That is, the steel sheet on which zinc plating film is not yet formed may be any one of a hot-rolled steel sheet or a cold-rolled steel sheet, and a method of manufacturing this steel sheet is not limited. From the viewpoint of productivity, a suitable method of manufacturing the steel sheet will be described below.

In the suitable method of manufacturing the zinc-plated steel sheet for hot stamping, the following processes are sequentially performed, the processes including: a heating process of heating a slab having the above-described chemical composition at 1200° C. or higher for 5 minutes or longer: a hot-rolling process of hot-rolling the slab such that a finish rolling temperature is 800° C. or higher and 980° C. or lower and coiling the hot-rolled slab at a coiling temperature of 450° C. or higher and 800° C. or lower to obtain a hot-rolled steel sheet: a cold-rolling process of pickling the hot-rolled steel sheet and subsequently cold-rolling the hot-rolled steel sheet such that a cumulative rolling reduction is 30% or higher and 80% or lower to obtain a cold-rolled steel sheet; and a zinc plating process of annealing the cold-rolled steel sheet in a temperature range of 700° C. or higher and 900° C. or lower to obtain a steel sheet and dipping the steel sheet in a molten zinc bath having an Al concentration of 0.155 mass % or more and 0.175 mass % or less for 1.0 second or longer and 15.0 seconds or shorter to form a zinc plating film on the steel sheet.

[Heating Process]

The slab having the above-described chemical composition is heated at 1200° or higher for 5 minutes or longer. When the slab heating temperature is lower than 1200° C. or the heating time is shorter than 5 minutes, hot rolling described below cannot be performed.

[Hot-Rolling Process]

Hot-rolling is performed such that the finish rolling temperature is 800° C. or higher and 980° C. or lower. When the finish rolling temperature is excessively low, deformation resistance increases, and it is difficult to perform rolling. When the finish rolling temperature is excessively high, a large amount of scale is produced, and surface dent increases. After finish rolling, the hot-rolled slab is coiled at a coiling temperature of 450° C. or higher and 800° C. or lower to obtain a hot-rolled steel sheet. When the coiling temperature is excessively low, water remains such that flatness deteriorates and it is difficult to perform cold rolling. When the coiling temperature is excessively high, the thickness of scale increases, a long period of time is required for pickling, and the productivity decreases.

[Cold-Rolling Process]

By cold-rolling the hot-rolled steel sheet after pickling, a cold-rolled steel sheet is obtained. Cold rolling is performed such that the cumulative rolling reduction is 30% or more and 80% or less. In the steel sheet according to the embodiment, the carbon content is large. Therefore, when cold-rolling is performed at an excessive cumulative rolling reduction, a load on a mill increases. When the cumulative rolling reduction excessively decreases, the productivity decreases. Therefore, the cumulative rolling reduction during cold rolling is 30% or more and 80% or less.

When the sheet thickness of the hot-rolled steel sheet before cold rolling is represented by $t_0$ and the sheet thickness of the cold-rolled steel sheet after cold rolling is represented by $t_1$, the cumulative rolling reduction can be represented by $\{(t_0-t_1)/t_0\}\times100(\%)$.

[Zinc Plating Process]

It is preferable that the zinc plating film is formed using a continuous hot-dip galvanizing line having excellent production efficiency. Hereinafter, a method of forming the zinc plating film on the continuous hot-dip galvanizing line will be described.

During the continuous hot-dip galvanizing, first, the cold-rolled steel sheet is heated in a heating furnace and annealed. For use in hot stamping, there is no particular limit on mechanical properties before hot stamping. Therefore, the annealing temperature is not particularly limited and may be 700° C. or higher. When the annealing temperature is higher than 900° C., the manufacturing costs increase. Therefore, the annealing temperature is set to be 900° C. or lower. The annealing time is not particularly limited and may be 1 minute to 5 minutes from the viewpoint of productivity. Regarding the annealing atmosphere on the continuous hot-dip galvanizing line, an ordinary method may be used, and the dew point may be −20° C. or lower. The dew point is −35° C. or lower.

Using the above-described method, the steel sheet is obtained.

By dipping the steel sheet obtained using the above-described method in a molten zinc bath and pulling up the steel sheet therefrom to form a zinc plating film on the steel sheet, the zinc-plated steel sheet for hot stamping that is applied to the hot-stamping formed body according to the embodiment is obtained. In the method of manufacturing the zinc-plated steel sheet for hot stamping, unlike the related art, conditions for forming the zinc plating film are strictly controlled such that the plating adhesion amount of the zinc plating film is 15.0 g/m$^2$ or more and less than 40.0 g/m$^2$ and the Al content in the zinc plating film is 100 mg/m$^2$ to 400 mg/m$^2$. Specifically, the Al concentration in the molten zinc bath is set to be 0.155 mass % or more and 0.175 mass % or less, and the steel sheet is dipped in the molten zinc bath for 1.0 second or longer and 15.0 seconds or shorter. The Al concentration in the molten zinc bath is preferably 0.157 mass % or more or 0.160 mass % or more. In addition, the Al concentration in the molten zinc bath is preferably 0.172 mass % or less or 0.170 mass % or less.

The plating adhesion amount of the zinc plating film may be controlled by adjusting the pulling speed or the flow rate of wiping gas blown from a nozzle. In addition, the Al concentration in the zinc plating film can be adjusted by controlling the plating bath composition, the plating bath temperature, and the dipping time in the plating bath. The Al content in the zinc plating film can be adjusted by controlling the plating adhesion amount in the zinc plating film.

When temper rolling is performed after the zinc plating process, the flatness of surface shape and the surface roughness of the zinc-plated steel sheet for hot stamping can be adjusted. Therefore, depending on the uses, temper rolling may be optionally performed after the zinc plating process.

5. Method of Manufacturing Hot-Stamping Formed Body

In the method of manufacturing the hot-stamping formed body according to the embodiment, A steel sheet for hot stamping is preheated by being heated in a temperature range of 600° C. or higher and 700° C. or lower and being held in this temperature range for 30 minutes or longer and 2 hours or shorter, is heated in a temperature range of 700° C. or higher and 1000° C. or lower, is held in this temperature range for 1 minute or longer and 20 minutes or shorter, and is subsequently hot-stamped. Under these heating conditions, the zinc plating film before hot stamping can be formed of a solid solution (Fe—Zn solid solution) of iron and zinc. Therefore, liquid metal embrittlement (LME) does not occur. In addition, by performing the above-described preheating, the zinc plating film can form the solid solution without passing through the solid-liquid coexisting state. Therefore, the surface roughness of the zinc plating film can be reduced. As a result, the bendability of the hot-stamping formed body can be improved.

Examples of a heating method before hot stamping include heating by an electric furnace or a gas furnace, flame heating, energization heating, high-frequency heating, and induction heating. In order to achieve quenching of a material by heating before hot stamping, the steel sheet is heated under the above-described heating conditions and is hot-stamped in the high temperature state, for example, using a die through which a water cooling pipe passes. At this time, the steel sheet comes into contact with the die to be rapidly cooled. The die may be heated in advance to change the quenching temperature or the cooling rate and to control manufacturing properties after hot stamping.

EXAMPLES

Next, examples of the present invention will be described. However, conditions of the examples are merely exemplary to confirm the operability and the effects of the present invention, and the present invention is not limited to these condition examples. The present invention can adopt various conditions within a range not departing from the scope of the present invention as long as the object of the present invention can be achieved under the conditions.

By performing heating, hot rolling, cold rolling, and zinc plating on slabs having chemical compositions shown in Table 1 under conditions shown in Table 2A, zinc-plated steel sheets for hot stamping shown in Table 2B were obtained. After hot rolling, the slab was pickled.

In addition, after zinc plating, the steel sheet No. 29 shown in Table 2B was held at 520° C. for 20 seconds for an alloying process.

The hot-rolled steel sheet obtained by hot rolling had a sheet thickness of 2.8 mm, and the cold-rolled steel sheet obtained by cold rolling had a sheet thickness of 1.4 mm.

Zinc plating was performed on the continuous hot-dip galvanizing line. Regarding annealing conditions, the dew point was set to −40° C., the steel sheet was held at a temperature shown in Table 2A for 200 seconds and was cooled up to a temperature range of 540° C. or lower at an average cooling rate of 6° C./sec. The plating bath temperature was set to 450° C. to 460° C. The adhesion amount of the zinc plating film was adjusted by adjusting the pulling speed from the molten zinc bath or the flow rate of wiping gas blown from a nozzle.

Regarding each of the obtained zinc-plated steel sheets for hot stamping, the plating adhesion amount, the Fe concentration, the Al content, and the Al concentration were measured using the above-described method. The obtained measurement results are shown in Table 2B.

TABLE 1

| Steel No. | Chemical Composition (mass %) Remainder Fe and Impurities | | | | | | | | | | |
|---|---|---|---|---|---|---|---|---|---|---|---|
| | C | Mn | sol. Al | Si | P | S | N | B | Ti | Nb | V |
| 1 | 0.04 | 2.60 | 0.075 | 0.03 | 0.007 | 0.001 | 0.0022 | 0.0022 | | | |
| 2 | 0.16 | 1.65 | 0.041 | 0.66 | 0.001 | 0.003 | 0.0014 | | | | |
| 3 | 0.21 | 1.32 | 0.091 | 0.14 | 0.017 | 0.003 | 0.0042 | 0.0079 | 0.021 | | |
| 4 | 0.32 | 1.62 | 0.031 | 0.23 | 0.012 | 0.001 | 0.0022 | 0.0024 | 0.021 | 0.042 | |
| 5 | 0.30 | 1.80 | 0.035 | 0.21 | 0.019 | 0.001 | 0.0049 | | 0.052 | 0.014 | 0.47 |
| 6 | 0.56 | 0.24 | 0.096 | 0.16 | 0.016 | 0.001 | 0.0057 | 0.0048 | 0.062 | 0.096 | |
| 7 | 0.21 | 1.18 | 0.012 | 0.22 | 0.008 | 0.002 | 0.0029 | 0.0032 | 0.026 | | |
| 8 | 0.32 | 1.64 | 0.018 | 0.19 | 0.015 | 0.002 | 0.0062 | 0.0042 | 0.021 | 0.039 | |
| 9 | 0.56 | 1.12 | 0.025 | 0.05 | 0.011 | 0.003 | 0.0052 | | 0.021 | 0.025 | |

TABLE 1-continued

| | | | | | | | | | |
|---|---|---|---|---|---|---|---|---|---|
| 10 | 0.47 | 0.38 | 0.029 | 0.18 | 0.012 | 0.001 | 0.0045 | 0.0035 | 0.020 0.030 |
| 11 | 0.28 | 0.80 | 0.072 | 0.28 | 0.012 | 0.001 | 0.0057 | 0.0015 | 0.034 0.013 |
| 12 | 0.34 | 2.82 | 0.043 | 0.16 | 0.011 | 0.003 | 0.0070 | 0.0072 | 0.053 0.026 |
| 13 | 0.43 | 1.94 | 0.045 | <u>2.25</u> | 0.027 | 0.002 | 0.0069 | 0.0046 | 0.007 0.069 |
| 14 | <u>0.01</u> | 3.21 | 0.062 | <u>0.45</u> | 0.020 | 0.001 | 0.0047 | 0.0015 | 0.048 0.082 |
| 15 | <u>0.26</u> | <u>2.51</u> | 0.054 | 0.42 | 0.029 | 0.001 | 0.0017 | 0.0050 | 0.058 0.028 |
| 16 | 0.28 | 0.80 | <u>1.200</u> | 0.28 | 0.012 | 0.001 | 0.0057 | 0.0015 | 0.034 0.013 |
| 17 | 0.38 | <u>0.05</u> | <u>0.025</u> | 0.42 | 0.018 | 0.002 | 0.0045 | | |

| Steel No. | Chemical Composition (mass %) Remainder Fe and Impurities | | | | | | Note |
|---|---|---|---|---|---|---|---|
| | W | Cr | Mo | Cu | Ni | Ca | REM |
| 1 | | | | | | | | Example |
| 2 | | | | | | | | Example |
| 3 | | | | | | | | Example |
| 4 | | | | | | | | Example |
| 5 | | | | | | | | Example |
| 6 | 0.74 | 0.23 | | | | | | Example |
| 7 | | 0.23 | | | | | | Example |
| 8 | | 0.23 | | | | | | Example |
| 9 | | | | | | | | Example |
| 10 | | 0.23 | 0.15 | | | | | Example |
| 11 | | 0.23 | 0.15 | | | 0.02 | | Example |
| 12 | | | | | | | 0.01 | Example |
| 13 | | 0.26 | | | | | | Comparative Example |
| 14 | | | 0.26 | | | | | Comparative Example |
| 15 | | <u>1.20</u> | | 0.24 | 0.35 | | | Comparative Example |
| 16 | | | | | | 0.02 | | Comparative Example |
| 17 | | | | | | | | Comparative Example |

The underline represents that the value is outside the range of the present invention.

TABLE 2A

| | | Heating | Hot Rolling | | Cold Rolling Cumulative | | Zinc Plating | | |
|---|---|---|---|---|---|---|---|---|---|
| Steel Sheet No. | Steel No. | Slab Heating Temperature (° C.) | Finish Rolling Temperature (° C.) | Coiling Temperature (° C.) | Rolling Reduction (%) | Annealing Temperature (° C.) | Al Concentration in Molten Zinc Bath (mass %) | Dipping Time (s) | Note |
| 1 | 1 | 1220 | 850 | 540 | 50 | 800 | 0.175 | 3.0 | Example |
| 2 | 2 | 1220 | 850 | 540 | 50 | 800 | 0.175 | 3.0 | Example |
| 3 | 3 | 1220 | 850 | 540 | 50 | 800 | 0.175 | 3.0 | Example |
| 4 | 4 | 1220 | 850 | 540 | 50 | 800 | 0.175 | 3.0 | Example |
| 5 | 5 | 1220 | 850 | 540 | 50 | 800 | 0.162 | 3.0 | Example |
| 6 | 6 | 1220 | 850 | 540 | 50 | 800 | 0.162 | 3.0 | Example |
| 7 | 7 | 1220 | 850 | 540 | 50 | 800 | 0.162 | 3.0 | Example |
| 8 | 8 | 1220 | 850 | 540 | 50 | 800 | 0.162 | 3.0 | Example |
| 9 | 9 | 1220 | 850 | 540 | 50 | 800 | 0.155 | 3.0 | Example |
| 10 | 10 | 1220 | 850 | 540 | 50 | 800 | 0.155 | 3.0 | Example |
| 11 | 11 | 1220 | 850 | 540 | 50 | 800 | 0.155 | 3.0 | Example |
| 12 | 12 | 1220 | 850 | 540 | 50 | 800 | 0.155 | 3.0 | Example |
| 13 | <u>13</u> | 1220 | 850 | 540 | 50 | 800 | 0.175 | 3.0 | Comparative Example |
| 14 | <u>14</u> | 1220 | 850 | 540 | 50 | 800 | 0.175 | 3.0 | Comparative Example |
| 15 | <u>15</u> | 1220 | 850 | 540 | 50 | 800 | 0.162 | 3.0 | Comparative Example |
| 16 | <u>16</u> | 1220 | 850 | 540 | 50 | 800 | 0.162 | 3.0 | Comparative Example |
| 17 | <u>17</u> | 1220 | 850 | 540 | 50 | 800 | 0.162 | 3.0 | Comparative Example |
| 18 | 8 | 1220 | 850 | 540 | 50 | 800 | <u>0.125</u> | 3.0 | Comparative Example |
| 19 | 8 | 1220 | 850 | 540 | 50 | 800 | 0.155 | 3.0 | Example |
| 20 | 8 | 1220 | 850 | 540 | 50 | 800 | 0.175 | 3.0 | Example |
| 21 | 8 | 1220 | 850 | 540 | 50 | 800 | <u>0.221</u> | 3.0 | Comparative Example |
| 22 | 8 | 1220 | 850 | 540 | 50 | 800 | 0.162 | 1.6 | Example |
| 23 | 8 | 1220 | 850 | 540 | 50 | 800 | 0.162 | 6.0 | Example |
| 24 | 8 | 1220 | 850 | 540 | 50 | 800 | 0.162 | 8.0 | Example |
| 25 | 8 | 1220 | 850 | 540 | 50 | 800 | 0.162 | <u>20.0</u> | Comparative Example |

TABLE 2A-continued

|  |  | Heating | Hot Rolling | | Cold Rolling Cumulative | Zinc Plating | | | |
|---|---|---|---|---|---|---|---|---|---|
| Steel Sheet No. | Steel No. | Slab Heating Temperature (° C.) | Finish Rolling Temperature (° C.) | Coiling Temperature (° C.) | Rolling Reduction (%) | Annealing Temperature (° C.) | Al Concentration in Molten Zinc Bath (mass %) | Dipping Time (s) | Note |
| 26 | 8 | 1220 | 850 | 540 | 50 | 800 | 0.162 | 3.0 | Example |
| 27 | 8 | 1220 | 850 | 540 | 50 | 800 | 0.162 | 3.0 | Comparative Example |
| 28 | 8 | 1220 | 850 | 540 | 50 | 800 | 0.162 | 3.0 | Comparative Example |
| 29 | 8 | 1220 | 850 | 540 | 50 | 800 | 0.148 | 1.6 | Comparative Example |
| 30 | 8 | 1220 | 850 | 540 | 50 | 800 | 0.155 | 1.6 | Comparative Example |
| 31 | 8 | 1220 | 850 | 540 | 50 | 800 | 0.175 | 3.0 | Example |
| 32 | 8 | 1220 | 850 | 540 | 50 | 800 | <u>0.221</u> | 8.0 | Comparative Example |

The underline represents that manufacturing conditions are not preferable.

TABLE 2B

| | | Zinc-Plated Steel Sheet for Hot Stamping | | | | |
|---|---|---|---|---|---|---|
| Steel Sheet No. | Steel No. | Plating Adhesion Amount (g/m²) | Fe Concentration (mass %) | Al Content (mg/m²) | Al Concentration (mass %) | Note |
| 1 | 1 | 29.8 | 3.8 | 307 | 1.03 | Example |
| 2 | 2 | 24.2 | 6.0 | 302 | 1.25 | Example |
| 3 | 3 | 18.3 | 7.6 | 275 | 1.51 | Example |
| 4 | 4 | 38.4 | 2.3 | 311 | 0.81 | Example |
| 5 | 5 | 19.4 | 7.1 | 231 | 1.19 | Example |
| 6 | 6 | 30.1 | 3.7 | 257 | 0.86 | Example |
| 7 | 7 | 38.8 | 2.9 | 261 | 0.66 | Example |
| 8 | 8 | 19.9 | 5.0 | 235 | 1.18 | Example |
| 9 | 9 | 24.1 | 5.9 | 200 | 0.83 | Example |
| 10 | 10 | 38.5 | 4.1 | 228 | 0.59 | Example |
| 11 | 11 | 22.1 | 4.7 | 215 | 0.97 | Example |
| 12 | 12 | 30.3 | 3.6 | 215 | 0.71 | Example |
| 13 | <u>13</u> | 30.1 | 4.8 | 306 | 1.02 | Comparative Example |
| 14 | <u>14</u> | 35.4 | 3.5 | 295 | 0.83 | Comparative Example |
| 15 | <u>15</u> | 37.0 | 2.8 | 255 | 0.69 | Comparative Example |
| 16 | <u>16</u> | 32.6 | 2.6 | 265 | 0.81 | Comparative Example |
| 17 | <u>17</u> | 26.6 | 4.3 | 233 | 0.95 | Comparative Example |
| 18 | 8 | 30.9 | 2.9 | <u>93</u> | <u>0.30</u> | Comparative Example |
| 19 | 8 | 23.1 | 6.8 | <u>171</u> | <u>0.74</u> | Example |
| 20 | 8 | 35.3 | 4.0 | 308 | 0.87 | Example |
| 21 | 8 | 29.9 | 3.1 | <u>473</u> | 1.58 | Comparative Example |
| 22 | 8 | 23.9 | 6.5 | <u>210</u> | 0.88 | Example |
| 23 | 8 | 18.6 | 6.9 | 266 | 1.43 | Example |
| 24 | 8 | 17.8 | 7.6 | 294 | 1.65 | Example |
| 25 | 8 | 34.3 | 2.2 | <u>443</u> | 1.29 | Comparative Example |
| 26 | 8 | 39.2 | 1.9 | <u>264</u> | 0.67 | Example |
| 27 | 8 | <u>52.2</u> | 1.6 | 290 | 0.56 | Comparative Example |
| 28 | 8 | <u>11.1</u> | 6.1 | 217 | 1.96 | Comparative Example |
| 29 | 8 | <u>23.6</u> | <u>12.6</u> | 124 | 0.53 | Comparative Example |
| 30 | 8 | <u>51.1</u> | <u>1.9</u> | 160 | <u>0.31</u> | Comparative Example |
| 31 | 8 | <u>18.5</u> | 6.8 | 310 | <u>1.68</u> | Example |
| 32 | 8 | <u>13.0</u> | 3.8 | 398 | <u>3.06</u> | Comparative Example |

The underline represents that manufacturing conditions are not preferable.

A test piece for hot stamping (test piece size: 250 mm in a sheet width direction×200 mm in a rolling direction) was collected from the obtained zinc-plated steel sheet for hot stamping. The test piece was heated such that the steel sheet temperature in a heating furnace reached a temperature shown in Tables 3A and 4A, was held at this temperature for a retention time shown in Tables 3A and 4A, was taken out from the heating furnace, was hot-stamped using a steel die for a flat sheet, and was rapidly cooled. As a result, a hot-stamping formed body was obtained. Some of the hot-stamping formed bodies were manufactured after preheating of holding the test piece at 650° C. for 1 hour.

Regarding the film of the obtained hot-stamping formed body, the film structure and the arithmetic average roughness Ra were measured using the above-described methods. The obtained measurement results are shown in Tables 3B and 4B.

(Spot Weldability Evaluation)

Regarding each of the hot-stamping formed bodies shown in Tables 3B and 4B, two test pieces having a size of 230 mm in the sheet width direction×180 mm in the rolling direction were collected from a position other than a region within 10 mm from an edge, these test pieces were disposed to overlap each other, and spot welding was performed while changing the current under the following conditions. A current at which the nugget diameter was 4 √t (t represents the sheet thickness of the test piece) was set to a lower limit, a current at which spatter occurred was set to an upper limit, and a range between the upper limit and the lower limit was set to an appropriate welding current range. In addition, welding was performed at a current value 0.5 kA lower than the upper limit at which spatter occurred, and a 1000-point continuous dotting test was performed to evaluate whether or not deposition occurred.

In Tables 3B and 4B, examples where the appropriate welding current range was 1.2 kA or higher were determined as "Pass" and were shown as "OK" in the appropriate welding current range of the table, and examples where the appropriate welding current range was lower than 1.2 kA or examples where spatter occurred at the current at which the nugget diameter was 4 √t were determined as "Fail" and were shown as "NG" in the appropriate welding current range of the table. In addition, examples where deposition did not occur were determined as "Pass" and were shown as "Not Occurred" in the table, and examples where deposition occurred were determined as "Fail" and were shown as "Occurred" in the table. In addition, the number of points where spark occurred among the 1000 points was counted. Examples where spark occurred at 50 points or more were determined as "Fail" and were shown as "NG" in the spark of the table, and examples where spark did not occur at 50 points or more were determined as "Pass" and were shown as "OK" in the spark of the table.

Welding Pressure: 400 kgf
Energization Time: 15 cycles
Retention Time: 9 cycles
Electrode Chip Shape: DR type, tip φ 6 mm-curvature radius R 40 mm (Coating Film Adhesion Evaluation)

Regarding each of the hot-stamping formed bodies shown in Tables 3B and 4B, a test piece (70 mm×150 mm) was cut from a position other than a region within 10 mm from an edge, a zinc phosphate treatment was performed using PBL-3080 (manufactured by Nihon Parkerizing Co., Ltd.) under typical chemical conversion conditions such that the adhesion amount was 3 g/m². Next, an electrodeposition lacquer GT-10 (manufactured by Kansai Paint Co., Ltd.) was electrodeposited by slope conduction at a voltage of 200 V and was baked at a baking temperature of 150° C. for 20 minutes. The thickness of the coating film was set to 20 μm. The test piece was dipped in ion exchange water at 50° C., was taken out after 240 hours, was scratched with a cutter knife in a grid shape with squares having a width of 1 mm, and underwent a peeling test with a polyester tape (manufactured by Nichiban Co., Ltd.). By comparing the numbers of squares remaining in the coating films to each other, the coating film adhesion was evaluated. The number of all the squares was set to 100. Regarding evaluation criteria, examples where the number of remaining squares was 90 to 100 were determined as "Good" and evaluated as "OK", and examples where the number of remaining squares was 0 to 89 were determined as "Bad" and evaluated as "NG"

(Tensile Strength Evaluation)

Regarding each of the hot-stamping formed bodies shown in Tables 3B and 4B, a JIS No. 5 test piece was collected from a position other than a region within 10 mm from an edge, and a tensile test according to JIS Z 2241:2011 was performed to obtain a tensile strength TS. When the tensile strength TS was 900 MPa or higher, it was determined that examples have high strength and were "Pass", and when the tensile strength TS was lower than 900 MPa, it was determined that examples did not have a desired strength for the hot-stamping formed body and were "Fail".

(Bendability Evaluation)

Regarding each of the hot-stamping formed bodies shown in Tables 3B and 4B, a 60 mm×60 mm test piece was collected from a position other than a region within 10 mm from an edge, and a bending test was performed according to VDA 238-100 to obtain a bending angle α (°). As the device, 20 KN load cell set (manufactured by Zwick) was used.

The product (TS×α(MPa·°)) of the tensile strength TS and the bending angle α obtained using the above-described methods was set to an index representing the bendability. It is determined that examples where TS×α(MPa·°) was 95000 MPa·° or higher had excellent bendability and were "Pass", and it is determined that examples where TS×α(MPa·°) was lower than 95000 MPa·° had poor bendability and were "Fail".

TABLE 3A

| Manufacturing No. | Steel Sheet No. | Preheating | Heating Temperature (° C.) | Retention time (min) | $Zn_{total}$ as Cumulative Amount of Zn (g/m²) | Zna as Cumulative Amount of Zn in region up to Peak Position of Al + Cumulative Amount of Mn (g/m²) | Cumulative Amount of Al + Cumulative Amount of Si + Cumulative Amount of Cr (mg/m²) | $Zn_{total}$ Zna (g/m²) | Arithmetic Average Roughness Ra (μm) | Note |
|---|---|---|---|---|---|---|---|---|---|---|
| B1 | 1 | Performed | 900 | 2 | 26.2 | 10.5 | 176 | 17.0 | 0.65 | Example |
| B2 | 2 | Performed | 900 | 2 | 19.6 | 8.1 | 206 | 13.3 | 0.67 | Example |
| B3 | 3 | Performed | 900 | 2 | 14.7 | 10.8 | 166 | 4.2 | 0.91 | Example |
| B4 | 4 | Performed | 900 | 2 | 34.8 | 9.1 | 189 | 27.6 | 0.67 | Example |
| B5 | 5 | Performed | 900 | 2 | 16.3 | 15.1 | 134 | 4.1 | 1.06 | Example |
| B6 | 6 | Performed | 900 | 2 | 25.5 | 7.7 | 197 | 18.7 | 1.40 | Example |
| B7 | 7 | Performed | 900 | 2 | 32.5 | 9.8 | 186 | 25.8 | 1.06 | Example |
| B8 | 8 | Performed | 900 | 2 | 16.7 | 13.9 | 142 | 4.0 | 1.28 | Example |
| B9 | 9 | Performed | 900 | 2 | 19.3 | 17.2 | 104 | 5.1 | 0.76 | Example |
| B10 | 10 | Performed | 900 | 2 | 34.1 | 10.0 | 175 | 23.0 | 0.62 | Example |
| B11 | 11 | Performed | 900 | 2 | 19.2 | 10.9 | 159 | 7.9 | 1.42 | Example |
| B12 | 12 | Performed | 900 | 2 | 26.3 | 14.5 | 138 | 12.3 | 0.70 | Example |
| B13 | <u>13</u> | Performed | 900 | 2 | 24.6 | 1.9 | <u>386</u> | 25.9 | 0.94 | Comparative Example |

TABLE 3A-continued

| | | | | | Hot stamping formed body | | | | | |
|---|---|---|---|---|---|---|---|---|---|---|
| Manufac-turing No. | Steel Sheet No. | Preheating | Heating Temperature (°C.) | Retention time (min) | $Zn_{total}$ as Cumulative Amount of Zn (g/m$^2$) | Zna as Cumulative Amount of Zn in region up to Peak Position of Al + Cumulative Amount of Mn (g/m$^2$) | Cumulative Amount of Al + Cumulative Amount of Si + Cumulative Amount of Cr (mg/m$^2$) | $Zn_{total}$ Zna (g/m$^2$) | Arithmetic Average Roughness Ra (μm) | Note |
| B14 | 14 | Performed | 900 | 2 | 31.8 | 25.6 | 203 | 6.7 | 1.11 | Comparative Example |
| B15 | 15 | Performed | 900 | 2 | 33.2 | 4.0 | 311 | 30.2 | 1.34 | Comparative Example |
| B16 | 16 | Performed | 900 | 2 | 27.6 | 0.8 | 613 | 28.3 | 1.42 | Comparative Example |
| B17 | 17 | Performed | 900 | 2 | 23.2 | 11.5 | 111 | 9.5 | 1.82 | Comparative Example |
| B18 | 18 | Performed | 900 | 2 | 25.7 | 28.8 | 93 | 3.9 | 1.24 | Comparative Example |
| B19 | 19 | Performed | 900 | 2 | 18.6 | 15.5 | 112 | 3.9 | 1.09 | Example |
| B20 | 20 | Performed | 900 | 2 | 30.2 | 8.1 | 196 | 23.5 | 1.10 | Example |
| B21 | 21 | Performed | 900 | 2 | 24.4 | 4.7 | 263 | 22.4 | 1.04 | Comparative Example |
| B22 | 22 | Performed | 900 | 2 | 20.3 | 14.7 | 132 | 6.2 | 1.49 | Example |
| B23 | 23 | Performed | 900 | 2 | 16.1 | 12.7 | 154 | 3.8 | 0.88 | Example |
| B24 | 24 | Performed | 900 | 2 | 13.9 | 11.2 | 172 | 4.5 | 1.28 | Example |

The underline represents that manufacturing conditions are not preferable or that the value is outside the range of the present invention.

TABLE 3B

| | | | | | Properties Evaluation | | | | |
|---|---|---|---|---|---|---|---|---|---|
| Manufacturing No. | Steel Sheet No. | TS × α (Mpa · °) | Tensile Strength TS (MPa) | Bending Angle α (°) | Appropriate Welding Current Range | Deposition | Spark | Coating Film Adhesion | Note |
| B1 | 1 | 101864 | 952 | 107 | OK | Not Occurred | OK | OK | Example |
| B2 | 2 | 101400 | 1352 | 75 | OK | Not Occurred | OK | OK | Example |
| B3 | 3 | 100386 | 1521 | 66 | OK | Not Occurred | OK | OK | Example |
| B4 | 4 | 101920 | 1820 | 56 | OK | Not Occurred | OK | OK | Example |
| B5 | 5 | 100016 | 1786 | 56 | OK | Not Occurred | OK | OK | Example |
| B6 | 6 | 99604 | 2692 | 37 | OK | Not Occurred | OK | OK | Example |
| B7 | 7 | 98475 | 1515 | 65 | OK | Not Occurred | OK | OK | Example |
| B8 | 8 | 101696 | 1816 | 56 | OK | Not Occurred | OK | OK | Example |
| B9 | 9 | 104348 | 2746 | 38 | OK | Not Occurred | OK | OK | Example |
| B10 | 10 | 101926 | 2486 | 41 | OK | Not Occurred | OK | OK | Example |
| B11 | 11 | 100005 | 1695 | 59 | OK | Not Occurred | OK | OK | Example |
| B12 | 12 | 99399 | 1949 | 51 | OK | Not Occurred | OK | OK | Example |
| B13 | 13 | 103400 | 2350 | 44 | NG | Occurred | OK | NG | Comparative Example |
| B14 | 14 | 99600 | 1200 | 83 | OK | Occurred | NG | OK | Comparative Example |
| B15 | 15 | 102300 | 1650 | 62 | NG | Not Occurred | OK | NG | Comparative Example |
| B16 | 16 | 99120 | 1680 | 59 | NG | Not Occurred | OK | NG | Comparative Example |
| B17 | 17 | 56232 | 792 | 71 | OK | Not Occurred | OK | OK | Comparative Example |
| B18 | 18 | 103797 | 1821 | 57 | OK | Occurred | NG | OK | Comparative Example |
| B19 | 19 | 101696 | 1816 | 56 | OK | Not Occurred | OK | OK | Example |

TABLE 3B-continued

| Manufacturing No. | Steel Sheet No. | TS × α (Mpa · °) | Tensile Strength TS (MPa) | Bending Angle α (°) | Appropriate Welding Current Range | Deposition | Spark | Coating Film Adhesion | Note |
|---|---|---|---|---|---|---|---|---|---|
| B20 | 20 | 103177 | 1809 | 57 | OK | Not Occurred | OK | OK | Example |
| B21 | 21 | 103495 | 1827 | 57 | OK | Not Occurred | OK | NG | Comparative Example |
| B22 | 22 | 100171 | 1786 | 56 | OK | Not Occurred | OK | OK | Example |
| B23 | 23 | 100685 | 1865 | 54 | OK | Not Occurred | OK | OK | Example |
| B24 | 24 | 106306 | 1810 | 59 | OK | Not Occurred | OK | OK | Example |

The underline represents that manufacturing conditions are not preferable or that the value is outside the range of the present invention.

TABLE 4A

| | | | | | Hot-stamping formed body | | | | | |
|---|---|---|---|---|---|---|---|---|---|---|
| Manufacturing No. | Steel Sheet No. | Preheating | Heating Temperature (° C.) | Retention time (min) | $Zn_{total}$ as Cumulative Amount of Zn (g/m$^2$) | Zna as Cumulative Amount of Zn in region up to Peak Position of Al + Cumulative Amount of Mn (g/m$^2$) | Cumulative Amount of Al + Cumulative Amount of Si + Cumulative Amount of Cr (mg/m$^2$) | $Zn_{total}$ Zna (g/m$^2$) | Arithmetic Average Roughness Ra (μm) | Note |
| B25 | 25 | Performed | 900 | 2 | 29.7 | 5.3 | 262 | 26.8 | 0.78 | Comparative Example |
| B26 | 26 | Performed | 900 | 2 | 34.2 | 9.2 | 196 | 26.1 | 0.94 | Example |
| B27 | 27 | Performed | 900 | 2 | 45.3 | 7.7 | 221 | 39.9 | 1.01 | Comparative Example |
| B28 | 28 | Performed | 900 | 2 | 9.0 | 8.7 | 119 | 0.7 | 1.05 | Comparative Example |
| B29 | 29 | Performed | 900 | 16 | 20.5 | 19.9 | 94 | 1.1 | 1.33 | Comparative Example |
| B30 | 30 | Performed | 900 | 2 | 49.1 | 25.5 | 146 | 13.1 | 0.85 | Comparative Example |
| B31 | 31 | Performed | 900 | 2 | 14.8 | 10.1 | 180 | 5.9 | 0.66 | Example |
| B32 | 32 | Performed | 900 | 2 | 10.2 | 9.0 | 214 | 1.8 | 0.88 | Comparative Example |
| B33 | 8 | Performed | 900 | 8 | 16.5 | 12.7 | 145 | 4.5 | 0.86 | Example |
| B34 | 8 | Performed | 900 | 16 | 15.1 | 13.6 | 138 | 3.1 | 1.22 | Example |
| B35 | 8 | Performed | 900 | 24 | 4.7 | 3.9 | 145 | 2.0 | 1.38 | Comparative Example |
| B36 | 1 | Not Performed | 900 | 2 | 27.3 | 11.3 | 185 | 17.1 | 2.14 | Comparative Example |
| B37 | 2 | Not Performed | 900 | 2 | 21.4 | 8.6 | 214 | 13.4 | 1.69 | Comparative Example |
| B38 | 3 | Not Performed | 900 | 2 | 16.3 | 12.3 | 167 | 4.3 | 2.76 | Comparative Example |
| B39 | 4 | Not Performed | 900 | 2 | 37.0 | 9.9 | 201 | 28.1 | 2.10 | Comparative Example |
| B40 | 5 | Not Performed | 900 | 2 | 17.5 | 16.5 | 136 | 1.4 | 1.55 | Comparative Example |
| B41 | 6 | Not Performed | 900 | 2 | 28.0 | 8.8 | 203 | 19.2 | 2.63 | Comparative Example |
| B42 | 7 | Not Performed | 900 | 2 | 37.3 | 10.2 | 193 | 27.8 | 1.56 | Comparative Example |
| B43 | 8 | Not Performed | 900 | 2 | 18.2 | 14.6 | 149 | 4.1 | 1.76 | Comparative Example |
| B44 | 9 | Not Performed | 900 | 2 | 21.9 | 19.1 | 112 | 3.1 | 1.65 | Comparative Example |
| B45 | 10 | Not Performed | 900 | 2 | 36.4 | 11.1 | 177 | 25.5 | 2.21 | Comparative Example |
| B46 | 11 | Not Performed | 900 | 2 | 20.3 | 12.4 | 165 | 8.1 | 1.68 | Comparative Example |
| B47 | 12 | Not Performed | 900 | 2 | 27.7 | 16.4 | 142 | 12.6 | 2.65 | Comparative Example |

The underline represents that manufacturing conditions are not preferable or that the value is outside the range of the present invention.

TABLE 4B

| | | | Tensile | | Appropriate | | | | |
|---|---|---|---|---|---|---|---|---|---|
| Manufacturing No. | Steel Sheet No. | TS × α (Mpa · °) | Strength TS (MPa) | Bending Angle α (°) | Current Range (kA) | Deposition | Spark | Coating Film Adhesion | Note |
| B25 | <u>25</u> | 106559 | 1855 | 57 | OK | Not Performed | OK | <u>NG</u> | Comparative Example |
| B26 | 26 | 103327 | 1802 | 57 | OK | Not Performed | OK | OK | Example |
| B27 | <u>27</u> | 98914 | 1815 | 54 | <u>NG</u> | Not Performed | OK | OK | Comparative Example |
| B28 | <u>28</u> | <u>88260</u> | 1801 | 49 | <u>NG</u> | <u>Performed</u> | OK | <u>NG</u> | Comparative Example |
| B29 | <u>29</u> | <u>84452</u> | 1836 | 46 | <u>NG</u> | <u>Performed</u> | OK | <u>NG</u> | Comparative Example |
| B30 | <u>30</u> | 101089 | 1803 | 56 | OK | <u>Performed</u> | <u>NG</u> | OK | Comparative Example |
| B31 | 31 | 106115 | 1799 | 59 | OK | Not Performed | OK | OK | Example |
| B32 | <u>32</u> | <u>89079</u> | 1856 | 48 | <u>NG</u> | <u>Performed</u> | OK | <u>NG</u> | Comparative Example |
| B33 | 8 | 103895 | 1798 | 58 | OK | Not Performed | OK | OK | Example |
| B34 | 8 | 105897 | 1814 | 58 | OK | Not Performed | OK | OK | Example |
| B35 | 8 | <u>88118</u> | 1836 | 48 | <u>NG</u> | <u>Performed</u> | OK | <u>NG</u> | Comparative Example |
| B36 | 1 | <u>88787</u> | 948 | 94 | OK | Not Performed | OK | OK | Comparative Example |
| B37 | 2 | <u>93617</u> | 1352 | 69 | OK | Not Performed | OK | OK | Comparative Example |
| B38 | 3 | <u>92598</u> | 1518 | 61 | OK | Not Performed | OK | OK | Comparative Example |
| B39 | 4 | <u>90900</u> | 1818 | 50 | OK | Not Performed | OK | OK | Comparative Example |
| B40 | 5 | <u>83801</u> | 1783 | 47 | OK | Not Performed | OK | OK | Comparative Example |
| B41 | 6 | <u>89143</u> | 2746 | 32 | OK | Not Performed | OK | OK | Comparative Example |
| B42 | 7 | <u>91661</u> | 1524 | 60 | OK | Not Performed | OK | OK | Comparative Example |
| B43 | 8 | <u>88669</u> | 1821 | 49 | OK | Not Performed | OK | OK | Comparative Example |
| B44 | 9 | <u>91554</u> | 2746 | 33 | OK | Not Performed | OK | OK | Comparative Example |
| B45 | 10 | <u>88795</u> | 2488 | 36 | OK | Not Performed | OK | OK | Comparative Example |
| B46 | 11 | <u>90876</u> | 1695 | 54 | OK | Not Performed | OK | OK | Comparative Example |
| B47 | 12 | <u>91536</u> | 1946 | 47 | OK | Not Performed | OK | OK | Comparative Example |

The underline represents that manufacturing conditions are not preferable or that the value is outside the range of the present invention.

It can be seen from Tables 3B and 4B that Examples have a high strength, can prevent spark and deposition during spot welding, have a wide appropriate welding current range, and have excellent coating film adhesion and bendability. In Examples shown in Tables 3B and 4B, the production of scale was not observed after hot stamping.

INDUSTRIAL APPLICABILITY

According to the above-described aspect of the present invention, it is possible to provide a hot-stamping formed body that has a high strength, has suppressed production of scale after hot stamping, can prevent spark and deposition during spot welding, has a wide appropriate welding current range, and has excellent coating film adhesion and bendability.

The invention claimed is:
1. A hot-stamping formed body comprising a steel sheet and a film disposed on the steel sheet,
wherein the steel sheet includes, as a chemical composition, by mass %:
C: 0.02% to 0.58%;
Mn: 0.10% to 3.00%;
sol. Al: 0.001% to 1.000%;
Si: 2.00% or less;
P: 0.100% or less;
S: 0.005% or less;
N: 0.0100% or less;
Ti: 0% to 0.200%;
Nb: 0% to 0.200%;
V: 0% to 1.00%;
W: 0% to 1.00%;
Cr: 0% to 1.00%;
Mo: 0% to 1.00%;
Cu: 0% to 1.00%;
Ni: 0% to 1.00%;
B: 0% to 0.0100%;
Ca: 0% to 0.05%;
REM: 0% to 0.05%; and
a remainder comprising Fe and impurities, and
wherein the film is formed by applying a plating adhesion amount of the film of 15.0 g/m$^2$ or more and less than 40.0 g/m$^2$, wherein the film includes, by mass %: Fe: 1.5% to 8.0%; Al: 0.50% to 3.00%; and a balance of Zn and impurities, and in the film, in Glow Discharge Optical Emission Spectrometry (GDS) measurement in a region from a surface of the film to a depth position of 100 μm from the surface, $Zn_{total}$ as a cumulative amount of Zn is 10.0 g/m² or more and less than 40.0 g/m², in GDS measurement in a region from the surface to a peak position of Al, a sum of Zna as a cumulative amount of Zn and a cumulative amount of Mn is 20.0 g/m² or less and a sum of a cumulative amount of Al, a cumulative amount of Si, and a cumulative amount of Cr is 60 mg/m² or more and 240 mg/m² or less, $Zn_{total}$–Zna is 3.0 g/m² or more and 30.0 g/m² or less, and an arithmetic average roughness Ra of the film is less than 1.50 μm.

2. The hot-stamping formed body according to claim 1, wherein the chemical composition of the steel sheet includes, by mass %, one or two kinds selected from the group of:

Ti: 0.005% to 0.200%;
Nb: 0.005% to 0.200%;
V: 0.10% to 1.00%;
W: 0.10% to 1.00%;
Cr: 0.05% to 1.00%;
Mo: 0.05% to 1.00%;
Cu: 0.05% to 1.00%;
Ni: 0.05% to 1.00%;
B: 0.0010% to 0.0100%;
Ca: 0.0005% to 0.05%; and
REM: 0.0005% to 0.05%.

3. The hot-stamping formed body according to claim 1, wherein the film includes a Zn-based oxide, a Mn-based oxide, and an Al-based oxide, and when the steel sheet includes Cr and Si, further includes a Cr-based oxide and a Si-based oxide.

* * * * *